United States Patent [19]
Zelt, III et al.

[11] Patent Number: 5,768,154
[45] Date of Patent: Jun. 16, 1998

[54] METHOD AND APPARATUS FOR MEASURING THE WIDTH OF METAL STRIP

[75] Inventors: Albert R. Zelt, III, Bethel Park; Paul S. Laskey, Pittsburgh, both of Pa.

[73] Assignee: Asko, Inc., Homestead, Pa.

[21] Appl. No.: 628,798

[22] Filed: Apr. 8, 1996

[51] Int. Cl.⁶ .................................................. G06T 7/60
[52] U.S. Cl. .................................... 364/562; 382/152
[58] Field of Search .......................... 364/562, 550, 364/551.01, 551.02; 382/106, 146, 147, 152; 356/394

[56] References Cited

U.S. PATENT DOCUMENTS

| | | | |
|---|---|---|---|
| 4,246,606 | 1/1981 | Yoshida | 358/106 |
| 4,760,444 | 7/1988 | Nielson et al. | 358/101 |
| 5,168,141 | 12/1992 | Tashjian et al. | 219/121.63 |
| 5,402,505 | 3/1995 | Roy et al. | 382/8 |
| 5,402,663 | 4/1995 | Rit et al. | 72/14 |
| 5,574,890 | 11/1996 | Rackoff et al. | 395/500 |
| 5,604,583 | 2/1997 | Byron et al. | 356/124 |

*Primary Examiner*—Emanuel T. Voeltz
*Assistant Examiner*—Patrick Assouad
*Attorney, Agent, or Firm*—Reed Smith Shaw & McClay LLP

[57] ABSTRACT

A method of monitoring a dimension of strip stock formed by a cutting device includes: providing an image producer that is movable between a home position and at least one subsequent position associated with the strip stock; moving the image producer to the at least one subsequent position where the field of view of the image producer substantially frames the strip stock dimension to be monitored; forming a first image of the strip stock dimension; and analyzing the first image of the strip stock dimension to determine the length thereof.

32 Claims, 7 Drawing Sheets

PRIOR ART

METHOD AND APPARATUS FOR MEASURING THE WIDTH OF METAL STRIP

BACKGROUND OF THE INVENTION

The present invention relates generally to metal strip and, more particularly, to a method and apparatus for continuously measuring the width of metal strip.

Strip metal is a commodity that is commonly produced by the metals industry. Typically, various operations must be performed on the metal strip before the strip can be processed into one or more final products. Operations typically performed on metal strip include edge-trimming, slitting, shearing and stamping operations.

In a slitting operation, a wide metal strip is cut into any suitable number of narrower strips or mults. Likewise, in an edge-trimming operation, a metal strip of, usually, non-uniform width is trimmed to a desired width. Slitting and edge-trimming operations are typically performed by rotary cutting knives mounted, respectively, above and below the strip at desired locations for cutting or trimming same.

To insure that the strips formed by slitting and trimming operations are suitable for their intended uses and products, it is imperative that the various dimensions of the strips be monitored. If, for example, the knives are incorrectly positioned to accurately slit or trim the strip, or if initially correctly-positioned knives gradually move out of position, then the processed strips will be incorrectly dimensioned and will have to be scrapped or re-processed, all of which results in increased processing costs.

Customarily, the dimensions of the processed strip are periodically manually checked to determine whether the strip is being slit or trimmed according to specification. Because strip dimension monitoring is usually performed periodically, a number of strip metal coils may be processed before a problem with accurate slitting or trimming is detected. Consequently, many of the resultant metal strips may need to be scrapped or reworked if the inaccurate slitting or trimming is unacceptable.

SUMMARY OF THE INVENTION

The present invention provides a method and apparatus for continuously monitoring various dimensions of processed strip stock. For example, the width of metal strip formed by edge-trimming or slitting operations is dependent on the proper positioning and quality of rotary and other knives. By continuously monitoring the width of the strip formed by the knives, the knives' positions can be timely readjusted when the width of the strip falls outside of a pre-determined parameter for strip width, thereby preventing the unnecessary scrapping or subsequent re-working of the metal strip.

According to a first aspect of the present invention, a method of monitoring a dimension of strip stock formed by a cutting device includes: providing at least one image producer movable between a home position and at least one subsequent position associated with the strip stock; moving the at least one image producer to the at least one subsequent position where the field of view of the at least one image producer substantially frames the strip stock dimension to be monitored; forming a first image of the strip stock dimension with the at least one image producer; and analyzing the first image of the strip stock dimension to determine the length thereof.

According to a dependent aspect of the present invention, the method of monitoring a dimension of strip stock further includes the steps of: comparing the length of the strip stock dimension to a pre-determined operating parameter; determining whether the length of the strip stock dimension is within the standard operating parameter; and alerting an operator if the length of the strip stock dimension is not within the standard operating parameter.

According to a second aspect of the present invention, an apparatus for monitoring a dimension of strip stock formed by at least one cutting device includes at least one image producer that is movably disposed between a home position and at least one subsequent position associated with the strip stock. The image producer has a field of view that substantially frames the strip stock dimension at the subsequent position and forms a first image of the strip stock dimension. In addition, an analyzer is connectively associated with the image producer to analyze the first image of the strip stock dimension and to determine the length thereof.

According to a third aspect of the present invention, an apparatus for monitoring a dimension of strip stock formed by at least one cutting device includes at least one transporter system disposed adjacent to the strip stock, and at least two image producers mounted on the transporter system at an adjustable distance from each other. Each of the image producers is movable by the transporter system between a home position and at least one subsequent position associated with the strip stock. Further, each of the image producers has a field of view that substantially frames the strip stock dimension at the subsequent position and forms a first image of the strip stock dimension. In addition, an analyzer is connectively associated with the image producers to analyze the first images of the strip stock dimension, and the adjustable distance between the image producers, to determine the length of the strip stock dimension.

By continuously monitoring the various dimensions of strip stock formed by, for example, rotary cutting knives, the present invention timely alerts operators when one or more dimensions of the strip stock fall outside of pre-determined parameters therefor. As a result, reprocessing costs and scrap rates for metal strip having unacceptable dimensions, such as strip width, are lowered.

The present invention, together with further objects and attendant advantages, will best be understood by reference to the following detailed description, taken in conjunction with the accompanying drawings.

DETAILED DESCRIPTION OF THE PRESENTLY PREFERRED EMBODIMENTS

The present invention is described below mainly in terms of a slitting operation for metal strip. However, it should be understood that the apparatus and method of the present invention may be adapted for use in edge-trimming and any other suitable operations in which metal or other strip stock is processed by, for example, rotary cutting knives.

For a full appreciation of the advantages of the present invention, it is helpful to initially consider the slitting process and its attendant equipment in some detail, and subsequently proceed to a discussion of the invention itself.

Slitting is the dividing of a single, wide strip stock into multiple narrower strips or mults. Although slitting machines vary in size from "table-top" slitters having small motors (i.e., those used for slitting foil to light gauge material) to very large machines requiring hundreds of feet of space, all slitting machines share three major components: (1) an uncoiler (also referred to as an unwinder or pay-off reel) for delivering the strip stock to the slitter; (2) a slitter head for holding the cutting knives and associated tooling; and (3) a recoiler (also referred to as a rewinder or take-up reel) for rewinding the mults.

Figure 1:
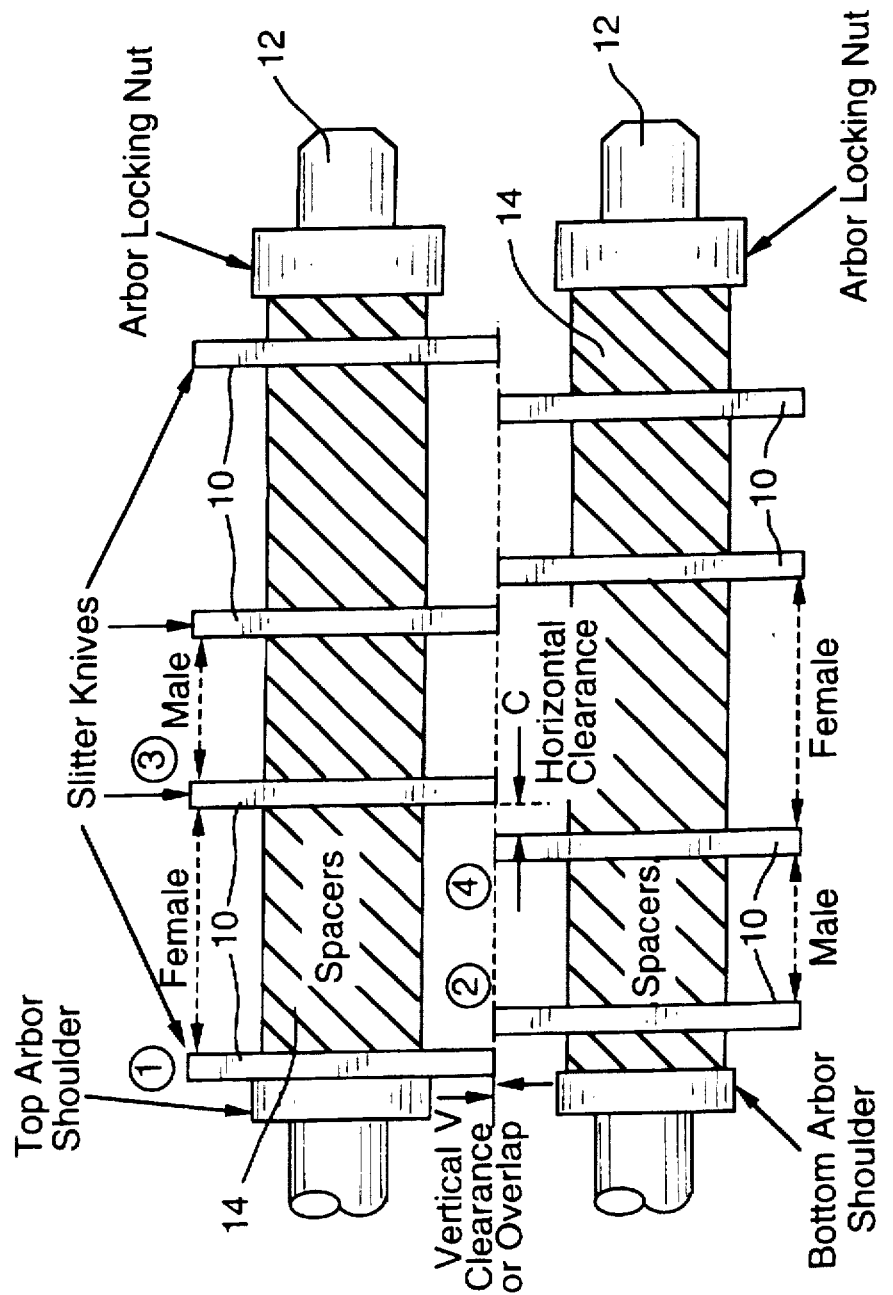
FIG. 1 is a schematic view of an arbor set-up for a slitting operation.
Figure 2A:
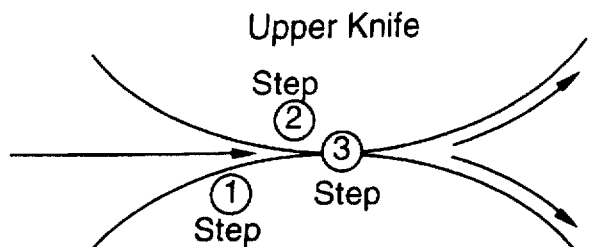
FIGS. 2a–2d are operational views of a pair of rotary knives processing a metal strip.
Figures 2B, 2C:
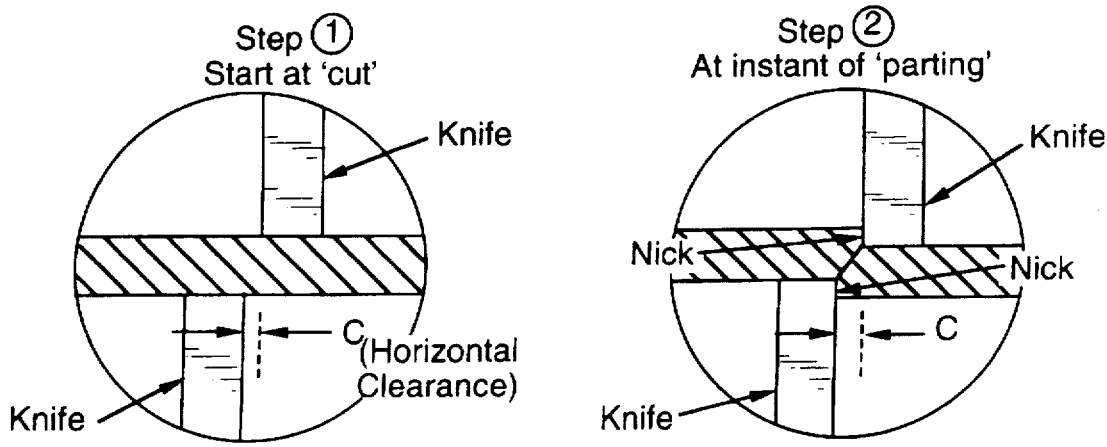
Figure 2D:
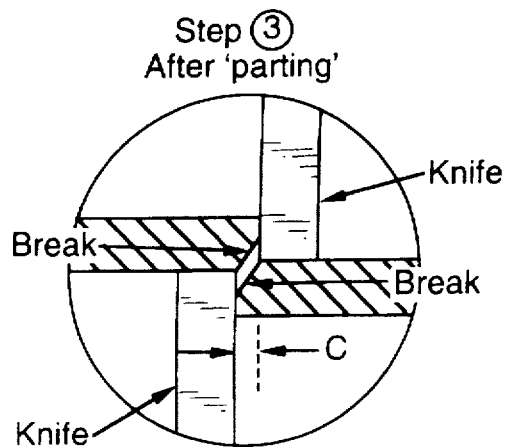

As shown in FIG. 1, a typical set-up for a slitting operation includes two sets of rotary cutting knives 10 mounted in staggered sequence on parallel shafts or arbors 12. The theoretical width of a mult formed thereby is approximately equal to the distance between consecutive cutting knives 10 on an arbor 12. However, as known by operators of slitting machines, the actual slit width of a particular mult generally differs from the theoretical slit width and, for most metals, is typically less than the theoretical width. To account for this "shrinkage" of slit width, operators generally adjust the positions of the cutting knives 10 to provide a theoretical slit width that is slightly greater than the specified slit width.

To adjust the cutting knives' positions to compensate for the variation between the theoretical and actual slit widths of mults formed by a slitting operation, operators have generally relied upon their own empirical experience with the type and gauge of the material being slit. Recently, however, a computer design tool has been designed to assist operators in estimating the slit width variation in specific slitting operations and to determine the knife adjustment required to achieve a desired mult width. Such a computer design tool is the subject of pending U.S. patent application Ser. No. 08/298,571, filed Aug. 31, 1994, now U.S. Pat. No. 5,574,890 which is assigned to the assignee of the present application, the contents of which are hereby incorporated by reference.

Referring again to FIG. 1, the cutting knives 10 in each pair are aligned and overlapped with each other to perform a slitting action on a strip stock (not shown) fed therebetween. Spacers 14 may be disposed between the knives 10 to accurately position them and thereby obtain desired slit or mult widths. Additionally, plastic shims (not shown) may be inserted between adjacent spacers 14, or between spacers 14 and knives 10, to precisely adjust the knives' positions and thereby obtain accurate slit width.

However, because the thickness of plastic shims may not be held to the tolerances required for precise slitting operations, current tolerance and quality requirements often mandate "shimless" slitting operations. To that end, ASKO, Inc. (the assignee of the present application), currently provides a Computer Assisted Shimless Slitting (CASS®) system, which is described in pending U.S. patent application Ser. No. 08/298,571, filed Aug. 31, 1994, now U.S. Pat. No. 5,574,890 the contents of which are hereby incorporated by reference. The CASS® system uses a computer program to customize shimless arbor set-ups, including knife positioning and horizontal clearance, for specific slitting operations.

As shown in FIGS. 2a–2d, during a slitting operation the knives 10 penetrate the strip 16 (see FIG. 2c) until the shear forces upon the strip 16 exceed the ultimate tensile strength of the material. At that point, the strip 16 separates (see FIG. 2d) into two or more mults 12. The present invention is particularly directed to monitoring the widths of the mults 12 formed by a slitting operation, and is described below in those terms. However, the present invention may be adapted to monitor any suitable mult dimension, including the height of the strip edge formed by the slitting operation.

Figure 3:
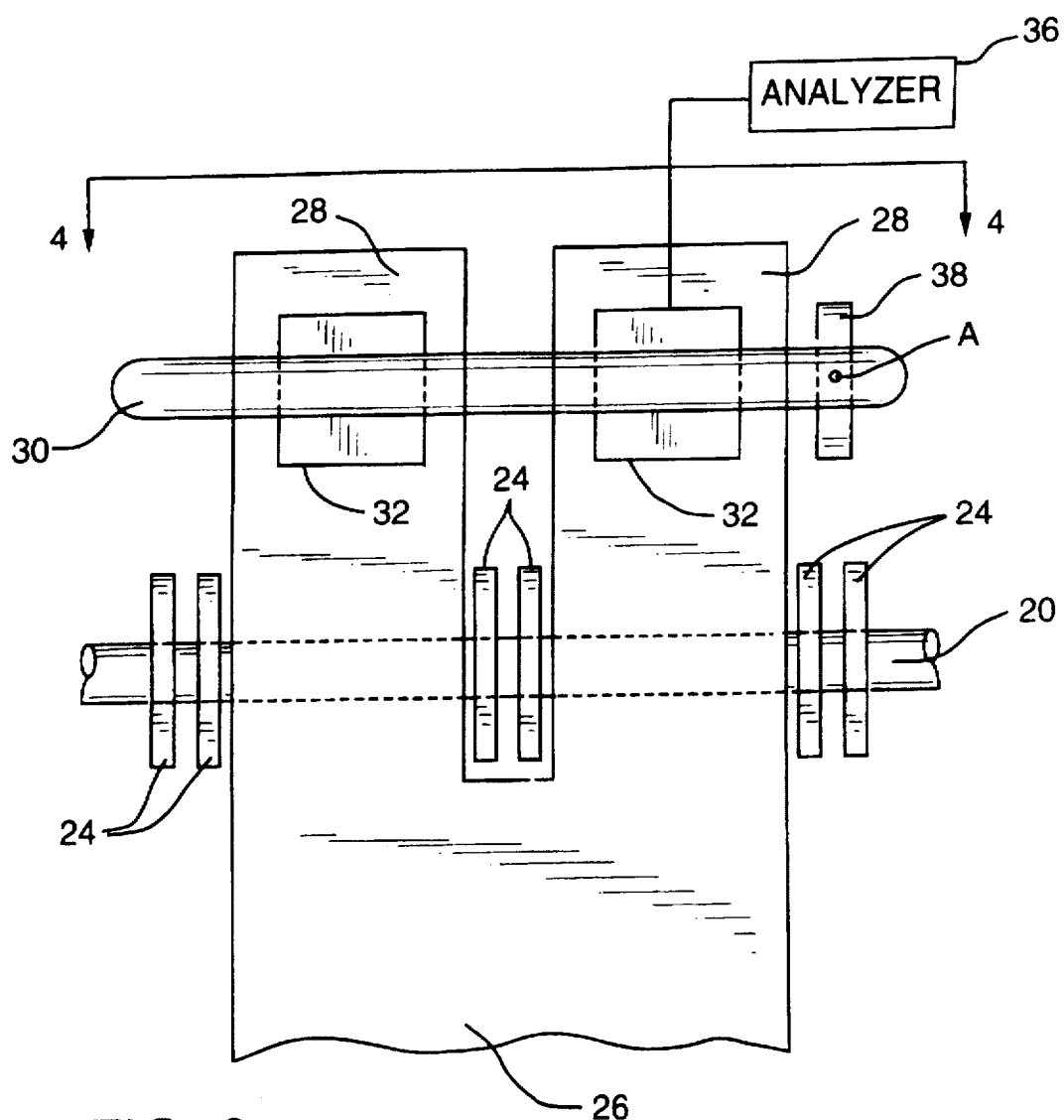
FIG. 3 is a plan view showing a pair of mults formed by a slitting operation and an image producer movably mounted to a transporter system supported above the mults.
Figure 4:
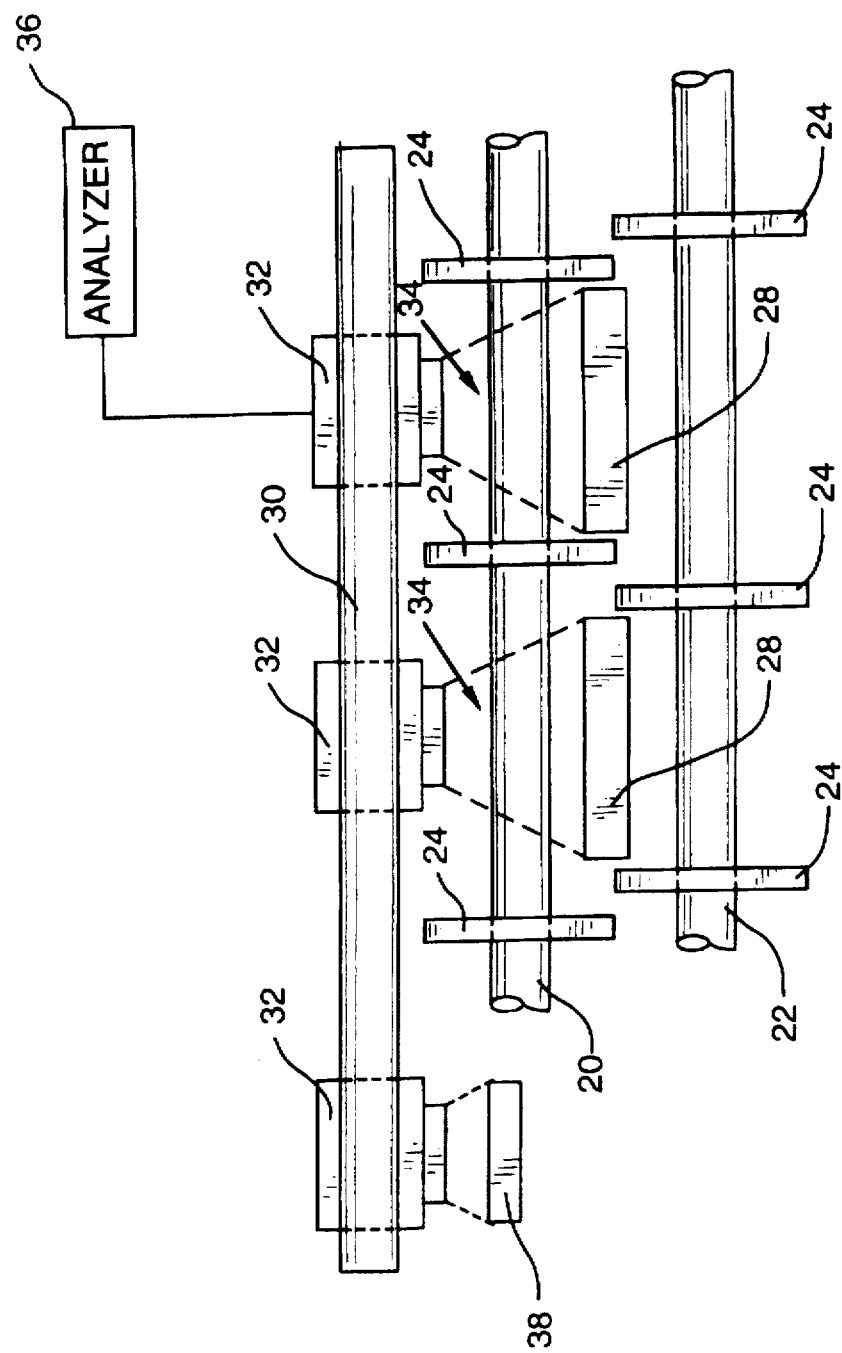
FIG. 4 is an elevational view taken along line 4—4 of FIG. 3.

FIGS. 3 and 4 depict a first preferred embodiment of the present invention. As shown therein, an upper arbor 20 and a lower arbor 22 each include three rotary cutting knives 24 mounted thereon. The cutting knives 24 form three pairs of knives that operate to slit a single strip 26 into two, narrower mults 28.

A transporter system 30 is preferably supported above the mults 28 at a suitable location "downstream" of the cutting knives 24. An image producer 32, such as a video camera and an attendant light source, is preferably movably mounted on the transporter system 30, and an analyzer 36 is connectively associated with the image producer 32.

The transporter system 30 may comprise an suitable system for accurately moving the image producer 32 therealong, including a servo-motor system or a step-motor system. Alternately, depending on the set-up of the slitting or other operation and the physical space constraints imposed by the arbors 20 and other equipment, the transporter system may be supported below the mults 28.

As mentioned above, the image producer 32 is movable to and between any position on the transporter system 30, including a home position (which corresponds approximately to point A in FIG. 4) and at least two subsequent positions (which correspond, respectively, to the mults 28).

At a position on the transporter system 30 corresponding to a respective mult 28, the field of view 34 of the image producer 32 is adjusted to substantially frame the width thereof, which is the preferable mult dimension to be monitored by this embodiment of the present invention. In addition, a light source (not shown) included with the image producer 32 focuses an intense light beam on the mult 28 to illuminate same. The image producer 32 forms a series of images of the width mult dimension and, as discussed in more detail below, the analyzer 36 analyzes the images in real time to determine the actual width dimension of the mult 28.

The operation of the image producer 32 and the analyzer 36 is discussed directly below and in the following pending U.S. patent applications, the contents of which are hereby incorporated by reference: U.S. patent application Ser. No.

08/583,454, filed Jan. 5, 1996, and titled "Method and Apparatus for Monitoring and Inspecting Rotary Knives;" and U.S. patent application Ser. No. 08/588,625, filed Jan. 19, 1996, and titled "Method and Apparatus for Monitoring and Inspecting Strip Edge," both of which are assigned to the assignee of the present application.

Typically, the strip mult 28 has a relatively finished surface. Therefore, the mult 28 is able to reflect at least a portion of the incident light beam from the light source (not shown). The contrast between the reflectivity of the mult 28 and the relative non-reflectivity of the background environment is utilized to allow the apparatus and method of the present invention to monitor the pertinent mult dimension.

As a mult 28 is formed by the slitting operation and passes by the image producer 32, the image producer 32 creates a series of images of the mult width dimension. The images formed by the image producer 32 contain "bright" areas that correspond to the mult 28. These "bright" areas are caused by the portion of the light beam that is reflected by the mult 28. In addition, the images contain "dark" areas that correspond to the background environment. The "dark" areas are caused by the portion of the light beam that is absorbed (i.e., not reflected) by the background environment.

As is known in the art, each of the images of the mult 28 formed by the image producer 32 is divided into a number of pixels. For example, a standard "frame grabber" forms images having 512 pixels along the horizontal and 512 pixels along the vertical. After calibrating the length of the image producer's field of view with an object of known dimension, or otherwise comparing the length of the field of view to a scale or other measuring device placed therewithin, each pixel defines a unit of measurement, which can be expressed in pixels per inch or some other suitable unit. Consequently, the "bright" pixels present in the images formed by the image producer 32, which correspond to the mult 28, can be counted along the width thereof and analyzed to determine the width dimension of the mult 28.

Depending on, for example, the field of view and focal length of a particular lens, and the location of the image producer 32 with respect to the mult 28, the unit of measurement defined by a pixel can vary dramatically. For example, an image producer 32 positioned at a first distance from the mult 28 may create images having pixels that define a unit of measurement of one pixel per inch. This same image producer, if positioned at a second distance from the mult 28 that is substantially closer thereto, may create images having pixels that define a 50 pixel per inch unit of measurement. Thus, depending on the tolerances required for a particular application, the position of the image producer 32 with respect to the mult 28 may vary considerably, or varying focal length lenses may be used. Moreover, as described in more detail below, to achieve required tolerances and precise measuring capabilities, more than one image producer may have to be used to monitor the width dimension of a single mult 28.

The images formed by the image producer 32 are supplied to the analyzer 36, which may be a PC-type computer. Although not shown, the analyzer 36 may include peripherals connected thereto, including one or more display monitors, a keyboard and/or a mouse or trackball for operator use and interaction with the present apparatus.

As discussed above, the analyzer 36 is programmed to digitize the images of the mult 28 and to determine the length of the mult dimension being monitored. Furthermore, the analyzer 36 can be programmed to compare the length of the mult dimension in question to a desired operating parameter for that mult dimension.

If, for example, the width of the mult 28 falls outside of the required width parameter therefor, the analyzer 36 can be programmed to alert a line operator and/or shut down the slitting or other operation to prevent unacceptable mults 28 from being formed. Subsequently, the mult width dimension may be analyzed, either manually or by a computer-controlled adjusting system, to determine how the cutting knives 24 should be adjusted to compensate for the error in the mult width dimension. Examples of such computer-controlled adjusting systems that can be interfaced with the present monitoring apparatus include the computer design tool and the CASS® system disclosed in pending U.S. patent application Ser. No. 08/298,571, filed Aug. 31, 1994, now U.S. Pat. No. 5,574,890 the contents of which are hereby incorporated by reference. The cutting knives 24 may then be manually or automatically adjusted to bring the mult width dimension back into the required parameter therefor.

On the other hand, if the mult dimension(s) being monitored falls within the required operating parameters, the knives 24 are permitted to continue slitting or otherwise processing the strip 26. Suitable software for handling the image information processing required for the present invention will be apparent to those in the data processing art. One such suitable image processing software is available from Medar, Inc., of Farmington Hills, Mich.

Referring once again to FIGS. 3 and 4, a first preferred embodiment of the method and apparatus for monitoring, for example, the width dimension of mults 28 will be described in detail below. Before a slitting or other operation commences, the transporter system 30, and thus the image producer 32, is adjusted with respect to the strip 26 to insure that the image producer 32 will form images of the mults 28 which, as discussed above, are adequate for precise measuring of the mult width dimension.

After the positions of the transporter system 30 and the image producer 32 are determined, the image producer 32 is moved along the transporter system to substantially the home position A, where, as discussed above, the field of view of the image producer 32 is calibrated with a calibration device 38, such as a gage block. Once the image producer 32 is calibrated, the slitting or other operation is commenced.

As the strip 26 is slit into two mults, the image producer 32 is moved between at least the two subsequent positions, which correspond, respectively, to the first and second mults 28. At each mult position, the image producer 32 forms images of the respective mult width dimension. As discussed above, these images are analyzed by the analyzer 36 to determine the length of the mult width dimension, and to compare the width dimension to a required operating parameter therefor to determine whether the mults 28 are being accurately formed. As can be appreciated, the image producer 32 is periodically moved between the first and second mults 28 to monitor each of their width dimensions.

After an operation is completed on a particular strip 26, and/or a new mult width dimension is required, the image producer 32 can be returned to the home position for re-calibration. This step insures that the mult width shown in the images will be accurately measured.

Because a particular mult 28 may be too wide for a single image producer to precisely measure its width, two or more image producers 32 may be used in tandem to measure a mult width or other dimension. For example, FIG. 5 depicts a second preferred embodiment of the present invention wherein two image producers are used to measure the width of a single mult 128.

Figure 5:
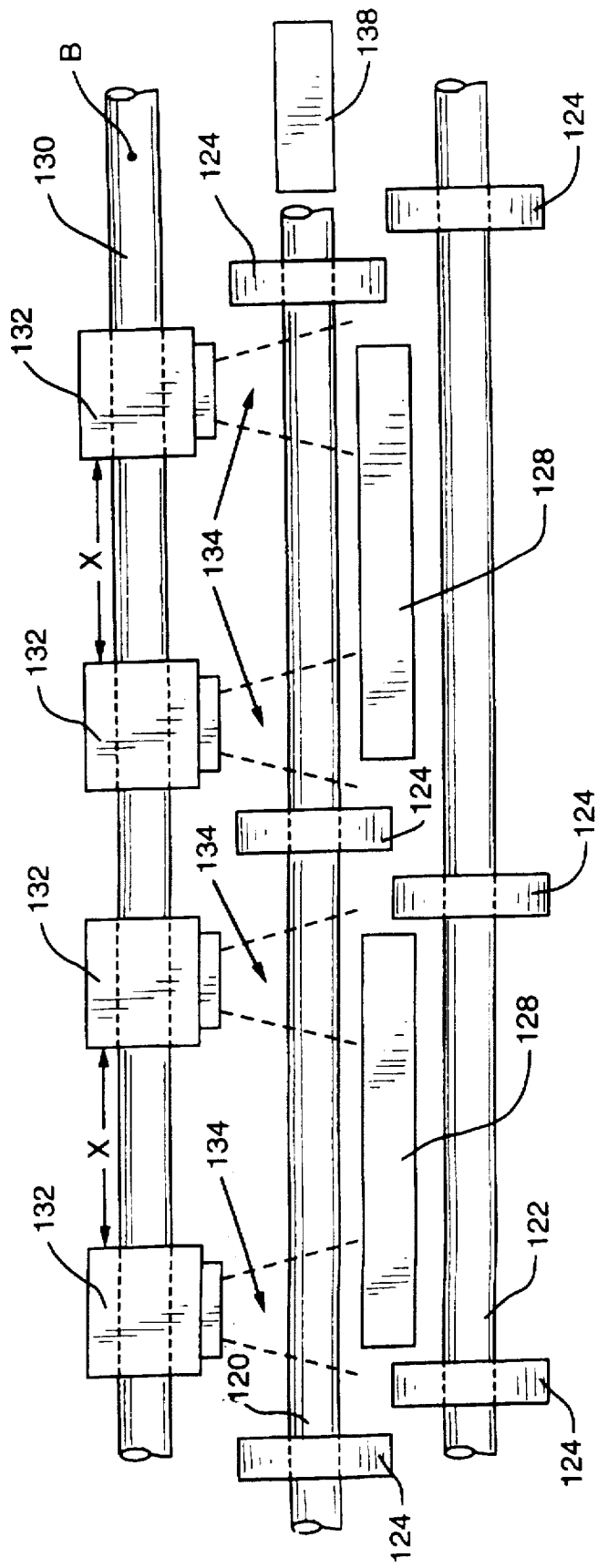
FIG. 5 is an elevational view similar to FIG. 4 showing a pair of image producers movably mounted to a transporter system supported above the mults formed by a slitting operation.

As shown in FIG. 5, two image producers 132 are movably mounted on a transporter system 130 between at least one home position B (where the image producers 132 are calibrated by a calibration device 138) and two other positions corresponding, respectively, to the mults 128. The image producers 132 are joined together at a defined, yet adjustable, distance from one another and are moved in tandem along the transporter system 130. An electronic scale (not shown) or other high-precision measuring device is connectively associated with the image producers 132 to measure the distance X therebetween.

As can be seen from FIG. 5, each of the image producers 132 is disposed above a respective edge 140 of a mult 128. Consequently, each image producer 132 forms images of the mult 128 which include only a portion of the mult width dimension thereof. By analyzing a pair of images of the mult formed at the same time by the image producers to determine the length of the mult portion shown therein, and factoring the distance between the centers of the image producers 128 as measured by the electronic scale, the total length of the mult width dimension can be determined.

After the width of the first mult 128 is monitored, the pair of image producers 132 is moved to the second mult 128 to monitor same, and then subsequently back and forth between the mults 128 until the slitting or other operation is completed.

To allow for differing mult widths, the distance between the two image producers may be adjusted. In addition, as also applicable to the first preferred embodiment discussed above, if it is desired to have continuous monitoring of both mults 128, two pairs of image producers 132 may be movably mounted on the transporter system 30, or two separate transporter systems 30 may be used (i.e., one for each pair of image producers 132).

Figure 6:
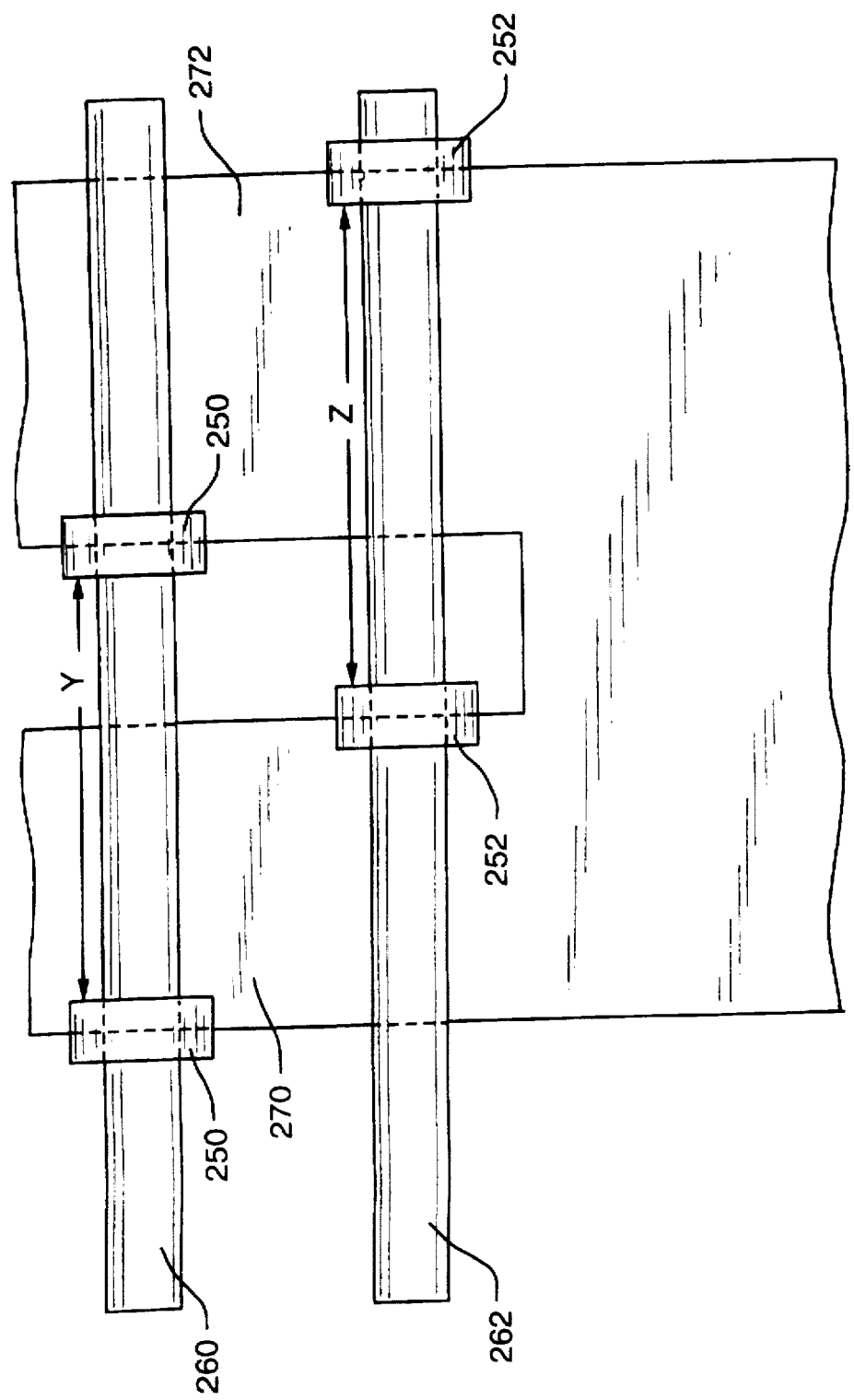
FIG. 6 is a plan view similar to FIG. 3 showing two independent transporter systems supported above the mults formed by a slitting operation, each of the transporter systems having an image producer movably mounted thereto.

In a third preferred embodiment shown in FIG. 6, an image producer 250, 252 may be mounted on two or more separate transporter systems 260, 262. In this embodiment, the first image producer 250 is initially positioned over the left edge of the first mult 270 and the second image producer 252 is positioned over the right edge of the first mult 270. At these stations, the image producers 250, 252 form images of the mult 270 from which the width thereof is determined. As discussed above with respect to the second preferred embodiment, an electronic scale (not shown) or other measuring device is connectively associated with the image producers 250, 252, together with a standard geometric calculation program, to determine the linear distance therebetween. This measurement permits the analyzer (not shown) to determine the length of the mult width dimension.

After the width of the first mult 270 is measured, the first image producer 250 is moved a distance Y along the first transporter system 260 to a position over the left edge of the second mult 272. Similarly, the second image producer 252 is moved a distance Z along the second transporter system 262 to a position over the right edge of the second mult 272. As described above, the images of the mult 272 are then formed by the image producers 250, 252 and subsequently analyzed to determine the width of the mult 272.

It should be appreciated that the image producers 250, 252 may be moved in any suitable order or sequence to measure the respective mult widths. Therefore, the sequence shown in FIG. 6 should be considered illustrative, and not restrictive, of the image producers' movement along the transporter systems 260, 262.

Figure 8:
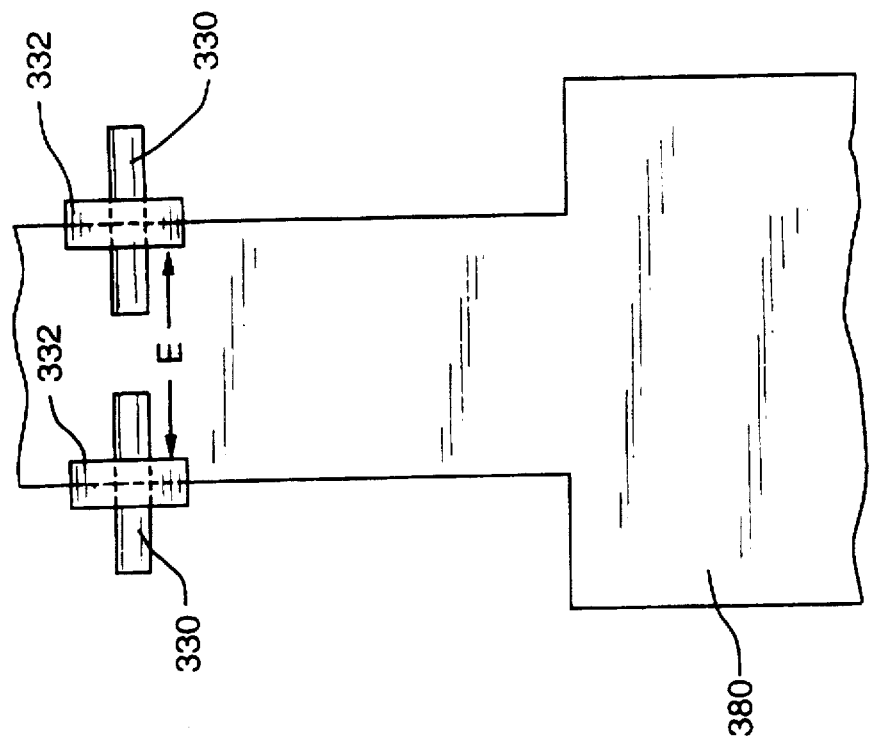
FIG. 8 is a plan view similar to FIG. 7 showing two independent transporter systems supported above a strip formed by an edge-trimming operation, each of the transporter systems having an image producer movably mounted thereto.
Figure 7:
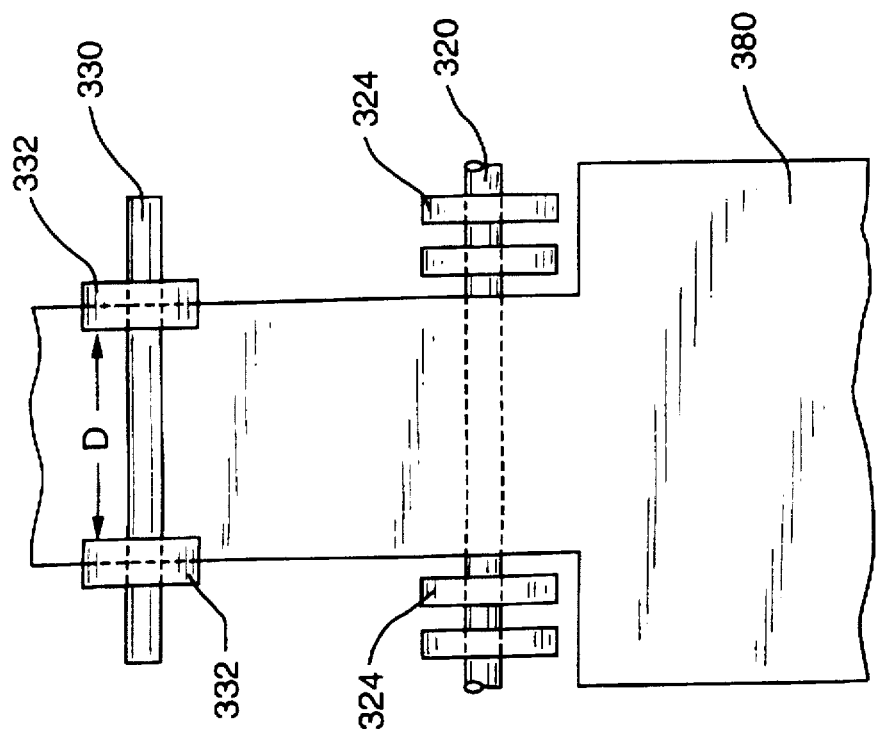
FIG. 7 is plan view showing a strip formed by an edge-trimming operation and a pair of image producers movably mounted to a transporter system supported above the strip.

FIGS. 7 and 8 depict, respectively, a fourth and a fifth preferred embodiment of the present invention in which an edge-trimming operation is performed on a strip stock 380. As shown in FIG. 7, two pairs of cutting knives 324 are mounted on two arbors 320 (only one of which is shown) for trimming the edge of strip stock 380. A transporter system 330 is supported above the strip 380 "downstream" from the cutting knives 324, and includes two image producers 332 movably mounted thereon at an adjustable distance D from each other. As described in detail above, the image producers 332 and an analyzer (not shown) connectively associated therewith cooperate to determine the width of the strip 380 being trimmed by the cutting knives 324.

FIG. 8 is very similar to FIG. 7, except for the image producers 332 being mounted on separate transporter systems 330, and being disposed at an adjustable distance E from each other. In all other respects, the apparatus depicted in FIG. 8 operates in substantially the same manner as the other embodiments described above.

The present invention has been described above mainly in terms of monitoring and measuring the width of strip stock. However, it should be understood that the present invention can be adapted and used for other suitable applications, including monitoring and measuring the height and length dimensions of strip stock. Furthermore, depending on the application and the width of the mult to be monitored, it is contemplated that two or more image producers and transporter systems may be used together to practice the present invention.

The following instruments may be used in the present invention: the analyzer may comprise a PC-type computer having at least a 66 Mhz 80486 processor, 8 MB of RAM, 2 camera inputs, 16 digital input/output (24 Volts DC) and a 400 MB hard disk; the peripherals for the analyzer may include a SVGA monitor, a keyboard and a mouse; the image producer may comprise a "TM-6" series CCD camera having a 75 mm lens provided by Pulnix; and the light source may be a "Type 800 Microlight" infrared illuminator provided by Dennard.

The present invention provides a method and apparatus for continuously monitoring various dimensions, including the width, of processed strip stock. By continuously monitoring the width of strip formed by, for example, cutting knives, the knives' positions can be timely readjusted when the width of the strip falls outside of a pre-determined parameter for strip width, thereby preventing the unnecessary scrapping or subsequent re-working of the metal strip.

It should be appreciated that the apparatus and method of the present invention may be configured and conducted as appropriate for the application. For example, the teachings of the present invention may be used to measure the camber of processed strip stock. The embodiments described above are to be considered in all respects as illustrative and not restrictive. The scope of the invention is defined by the following claims rather than by the foregoing description. All changes which come within the meaning and range of equivalency of the claims are to be embraced within their scope.

What is claimed and desired to be secured by Letters Patent of the United States is:

1. A method of monitoring a dimension of strip stock formed by at least one cutting device, comprising the following steps:

provic at least one image producer having a field of view, the at least one image producer being movable between a home position and at least one subsequent position associated with the strip stock;

moving the at least one image producer to the at least one subsequent position where the field of view of the at least one image producer substantially frames the strip stock dimension to be monitored after the strip stock is formed by the at least one cutting device;

forming a first image of the strip stock dimension with the at least one image producer; and analyzing the first image of the strip stock dimension to determine the length thereof.

2. The method of claim 1, further comprising the steps of:

providing at least one calibration device positioned adjacent to the home position;

moving the at least one image producer to the home position; and calibrating the length of the field of view of the at least one image producer at the home position with the calibration device.

3. The method of claim 2 wherein the step of analyzing comprises the following steps:

comparing the calibrated length of the field of view of the at least one image producer to the strip stock dimension; and determining the length of the strip stock dimension.

4. The method of claim 1, further comprising the steps of:

comparing the length of the strip stock dimension to a pre-determined operating parameter for the length of the strip stock dimension;

determining whether the length of the strip stock dimension is within the standard operating parameter; and alerting an operator if the length of the strip stock dimension is not within the standard operating parameter.

5. The method of claim 4, further comprising the steps of:

providing an adjusting means for adjusting the position of the at least one cutting device;

determining the difference between the length of the strip stock dimension and the standard operating parameter;

communicating the difference between the length of the strip stock dimension and the standard operating parameter to the adjusting means; and using the adjusting means to adjust the position of the at least one cutting device.

6. The method of claim 5 wherein the adjusting means comprises a computer-controlled positioning system.

7. The method of claim 1 wherein the strip stock comprises a metal strip.

8. The method of claim 1 wherein the dimension of strip stock comprises the width of strip stock.

9. The method of claim 1 wherein the at least one calibration device comprises a gage block.

10. The method of claim 1 wherein the at least one image producer comprises two or more image producers.

11. The method of claim 1 wherein the at least one cutting device comprises at least one cutting knife.

12. An apparatus for monitoring a dimension of strip stock formed by at least one cutting device, the apparatus comprising:

at least one image producer movably disposed between a home position and at least one subsequent position associated with the strip stock, the at least one image producer having a field of view operable to substantially frame the strip stock dimension at the at least one subsequent position and to form a first image of the strip stock dimension; and an analyzer connectively associated with the at least one image producer, the analyzer operable to analyze the first image of the strip stock dimension to determine the length thereof.

13. The apparatus of claim 12, further comprising:

a calibration device disposed adjacent to the home position, the calibration device operable to calibrate the length of the field of view of the at least one image producer;

whereby the at least one image producer is moved from the home position where it is calibrated to the at least one subsequent position where it forms the first image of the stock strip dimension to be monitored.

14. The apparatus of claim 12, further comprising a transporter for moving the at least one image producer between the home position and the at least one subsequent position.

15. The apparatus of claim 14 wherein the transporter comprises a servo-motor system.

16. The apparatus of claim 12 wherein the analyzer compares the length of the strip stock dimension to a standard operating parameter therefor.

17. The apparatus of claim 16, further comprising an adjuster for adjusting the position of the at least one cutting device when the length of the strip stock dimension is not within a standard operating parameter therefor.

18. The apparatus of claim 16 wherein the analyzer alerts an operator if the length of the strip stock dimension is not within the standard operating parameter.

19. The apparatus of claim 17 wherein the adjuster comprises a computer-controlled positioning system.

20. An apparatus for monitoring a dimension of strip stock formed by at least one cutting device, the apparatus comprising:

at least one transporter system disposed adjacent to the strip stock;

at least two image producers mounted on the transporter system at an adjustable distance from each other, each of the at least two image producers being movable by the at least one transporter system between a home position and at least one subsequent position associated with the strip stock, each of the at least two image producers having a field of view operable to substantially frame the strip stock dimension at the at least one subsequent position and to form a first image of the strip stock dimension; and an analyzer connectively associated with the at least two image producers, the analyzer operable to analyze the first images of the strip stock dimension formed by the at least two image producers and the adjustable distance between the at least two image producers to determine the length of the strip stock dimension.

21. The apparatus of claim 20, further comprising:

a calibration device disposed adjacent to the home position, the calibration device operable to calibrate the length of the field of view of each of the at least two image producers;

whereby the at least one transporter system moves each of the at least two image producers from the home position where they are calibrated by the calibration device to the at least one subsequent position where they form the first images of the strip stock dimension.

22. The apparatus of claim 20 wherein the at least one transporter system comprises two transporter systems, and further wherein one of the at least two image producers is mounted on each of the two transporter systems.

23. The apparatus of claim 20 wherein the at least one transporter system comprises one transporter system, and further wherein the at least two image producers are mounted on the transporter system.

24. The apparatus of claim 20 wherein the at least one transporter system comprises a servo-motor system.

25. The apparatus of claim 20 wherein the analyzer compares the length of the strip stock dimension to a standard operating parameter for strip stock dimension.

26. The apparatus of claim 25, further comprising an adjuster mechanism for adjusting the position of the at least cutting device when the length of the strip stock dimension is not within the standard operating parameter.

27. The apparatus of claim 25 wherein the analyzer alerts an operator if the length of the strip stock dimension is not within the standard operating parameter.

28. The apparatus of claim 26 wherein the adjuster mechanism comprises a computer-controlled positioning system.

29. The method according to claim 1, wherein the at least one image producer is adapted to form an image of the strip stock dimension only with respect to one item of strip stock at a time.

30. The method according to claim 1, wherein the dimension of strip stock comprises a physical dimension of strip stock.

31. The apparatus according to claim 12, wherein the at least one image producer is adapted to form an image of the strip stock dimension only with respect to one item of strip stock at a time.

32. The apparatus according to claim 12, wherein the dimension of strip stock comprises a physical dimension of strip stock.

* * * * *